US009022203B2

(12) United States Patent
LaPierre et al.

(10) Patent No.: US 9,022,203 B2
(45) Date of Patent: May 5, 2015

(54) LUG LOADER

(71) Applicant: U.S. Natural Resources, Inc., Woodland, WA (US)

(72) Inventors: Andre LaPierre, Woodland, WA (US); Damon Clinch, Woodland, WA (US)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 14/055,513

(22) Filed: Oct. 16, 2013

(65) Prior Publication Data

US 2014/0102862 A1 Apr. 17, 2014

Related U.S. Application Data (60) Provisional application No. 61/714,690, filed on Oct. 16, 2012.

(51) Int. Cl.
*B65G 47/244* (2006.01)
*B65G 15/58* (2006.01)
*B65G 47/31* (2006.01)

(52) U.S. Cl.
CPC ............... *B65G 15/58* (2013.01); *B65G 47/31* (2013.01); *B65G 2201/0282* (2013.01); *B65G 2203/041* (2013.01)
USPC ........... 198/395; 198/382; 198/401; 198/415; 198/575; 198/577; 198/604; 198/620; 198/622; 198/623

(58) Field of Classification Search
CPC ........ B65G 43/08; B65G 43/10; B65G 37/00; B65G 15/12; B65G 15/14; B65G 19/24; B65G 47/244; B65G 2203/0225; B65G 2203/042; B65G 2301/34
USPC ......... 198/382, 395, 401, 415, 575, 577, 604, 198/605, 620, 622, 623, 726; 271/184, 185
See application file for complete search history.

(56) References Cited

U.S. PATENT DOCUMENTS

| 3,084,090 A | 4/1963 | Rambo et al. |
| 3,944,049 A | 3/1976 | Graybill |

(Continued)

FOREIGN PATENT DOCUMENTS

| CA | 2577656 A1 | 8/2008 |
| CA | 2851910 | 8/2008 |
| CA | 2830302 | 4/2014 |

OTHER PUBLICATIONS

Canadian Examiner's Report for CA2851910, issued Jul. 14, 2014.

(Continued)

*Primary Examiner* — Leslie A Nicholson, III
(74) *Attorney, Agent, or Firm* — Schwabe, Williamson & Wyatt (57) ABSTRACT

Embodiments provide methods, systems, and apparatuses for loading workpieces in a flow direction into the spaced apart lugs on a lugged conveyor with the workpieces oriented transverse to the flow direction. The lug loader includes an array of pairs of endless conveyors configured to convey workpieces toward a lugged conveyor. The first and second endless conveyors of each pair are spaced laterally apart across the flow direction and aligned substantially in the flow direction. The array can form a continuous or discontinuous transport surface. Some pairs of endless conveyors in the array may overlap one or more other pairs of endless conveyors in the array. At least one pair of endless conveyors in the array may include two or more endless conveyors that are independently driven at different speeds and/or in different directions to de-skew a workpiece.

30 Claims, 7 Drawing Sheets

(56) References Cited

U.S. PATENT DOCUMENTS

| | | | |
|---|---|---|---|
| 4,077,524 | A | 3/1978 | Rysti |
| 4,144,976 | A | 3/1979 | Rysti |
| 4,154,043 | A | 5/1979 | Heide |
| 4,197,935 | A | 4/1980 | Aterianus et al. |
| 4,330,055 | A | 5/1982 | Lunden |
| 4,372,438 | A | 2/1983 | Hayashi |
| 4,518,075 | A | 5/1985 | Aykut et al. |
| 4,638,440 | A | 1/1987 | Brough et al. |
| 4,807,739 | A | 2/1989 | Wolf et al. |
| 4,869,360 | A | 9/1989 | Brown et al. |
| 4,967,899 | A | 11/1990 | Newsome |
| 5,100,125 | A * | 3/1992 | Uplinger et al. ............. 271/233 |
| 5,341,915 | A | 8/1994 | Cordia et al. |
| 5,419,425 | A | 5/1995 | Goater |
| 5,617,910 | A | 4/1997 | Hill |
| 5,660,262 | A | 8/1997 | Landrum et al. |
| 5,662,203 | A | 9/1997 | St. Pierre et al. |
| 5,813,512 | A | 9/1998 | Andersson et al. |
| 5,921,376 | A | 7/1999 | Michell et al. |
| 5,924,548 | A * | 7/1999 | Francioni ...................... 198/415 |
| 6,095,316 | A | 8/2000 | Redden |
| 6,164,431 | A * | 12/2000 | Morisod ....................... 198/415 |
| 6,189,682 | B1 | 2/2001 | Hill |
| 6,199,683 | B1 | 3/2001 | Michell et al. |
| 6,964,330 | B2 | 11/2005 | Kujat et al. |
| 7,097,029 | B2 * | 8/2006 | Halang ......................... 198/779 |
| 7,578,382 | B2 | 8/2009 | Kujat et al. |
| 7,703,597 | B2 * | 4/2010 | Jansen .......................... 198/415 |
| 7,938,247 | B2 | 5/2011 | Kujat et al. |
| 8,434,609 | B2 * | 5/2013 | Buerge ......................... 198/415 |
| 2012/0228085 | A1 * | 9/2012 | Sjogren et al. ................ 198/415 |

OTHER PUBLICATIONS http://www.ultimizers.com/narrowboard.html—Ultimizers Inc., dated Jul. 21, 2006, pp. 1 and 2.
http://www.baldormotion.com/products/mint/mintrnt.asp—Mint Automation Software and Applications, Literature No. BR1202-B, p. 8.
Rexroth Bosch Group, Drive & Control Profile, 2003 Bosch Rexroth Corporation, Form: Campbell-Hardage-2003 (0703)—www.boschrexroth-us.com.
http://www.krakenautomation.com/prod_InfeedTransfer_SmartBelt—Kraken Automation, Servo Smart-Belt Infeeds & Transfers pp. 1 and 2, dated Jul. 21, 2006.
Examiner's Report from the Canadian Intellectual Property Office dated Mar. 28, 2013.
Examiner's Report from the Canadian Intellectual Property Office dated Dec. 17, 2013.
Canadian Examiner's Report for CA 2,830,302 mailed Mar. 12, 2015.

* cited by examiner

LUG LOADER

CROSS REFERENCE TO RELATED APPLICATIONS

The present application claims priority to U.S. patent application Ser. No. 61/714,690, filed Oct. 16, 2012, and titled "LUG LOADER," the entire disclosure of which is hereby incorporated by reference.

TECHNICAL FIELD

Embodiments herein relate to the field of lumber processing, and, more specifically, to methods, systems, and apparatuses for loading workpieces onto a lugged conveyor.

BACKGROUND

Conventional lug loaders or singulators (hereinafter collectively referred to as either lug loaders or singulators) have been found to be inadequate at higher feed speeds. They are also limited in their ability to both singulate and allocate lumber. When lumber is of varying widths and varying in thickness, or bowed, as may be predominant in curve sawing mills, cupped or crooked, and/or skewed on the transfer, it becomes increasingly difficult to handle the lumber at desirable higher speeds.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for loading a lugged conveyor are provided. In exemplary embodiments, a computing device may be endowed with one or more components of the disclosed apparatuses and/or systems and may be employed to perform one or more methods as disclosed herein.

Examples of virtual lug loaders are disclosed in U.S. Pat. Nos. 7,578,382 and 7,938,247, both of which are owned by the assignee of the present application, which is directed to a lug loader. The disclosures of the patents are substantially reproduced below for ease of reference.

Embodiments herein provide methods, systems, and apparatuses for the singulation or allocation of lumber into lug spaces on a lugged transfer, or other lumber conveying device.

Some embodiments provide a system for collecting, singulating, straightening, allocating and consistently spacing, rough sawn lumber or planed finished lumber, or sticks of varying widths, thickness and lengths into consecutive spaced-apart lugs, or allocated spacings onto a transfer, or lugged transfer, or to a stick placing device, at high speeds.

The present disclosure relates to a transfer system. The transfer system makes use of conveyors such as chains or belts to move lumber pieces downstream while oriented traversely across the flow path. The lumber pieces enter the virtual lug loading system according to the present invention moving transversely. The lumber pieces may enter as a tightly spaced sheet or mat of pieces with no gaps, or the lumber pieces may be randomly spaced and oriented.

Within the system pairs of transfers create consistent gaps between individual lumber pieces. The transfers within a pair may be driven individually or ganged together. In one embodiment individual transfers or pairs of transfers are selectively and independently actuable to vary their speeds so that the gaps may be created and/or workpieces may be deskewed.

The transfers may create and maintain gapping, that is the spacing between lumber pieces, and allow a surge capacity. Being individually driven, the transfers also provide for skew correction should the lumber pieces arrive skewed or skew during a transition from one transfer to another. These transfers gap and straighten the pieces as required so that one piece is positioned into each lug space on downstream lugged transfer chains. Thus, individually driven belts provide skew correction to correct the orientation of skewed lumber pieces on the infeed to the lugged transfer being loaded. Keeping the lumber pieces straight, that is oriented traversely across the flow path on the infeed, helps deal the lumber pieces into the lug spaces.

Dealing the boards directly into lug spaces without a mechanical lug loader simplifies the loading of the lug spaces in the lugged transfer as compared to the prior art. It improves operator access, and reduces the amount of mechanical components requiring maintenance.

In one aspect of the present invention, servo controlled decks singulate the lumber pieces and position them directly into a lugged chain.

In summary, a lug loader as described herein may be operable for loading workpieces in a flow direction into the spaced apart lugs on a lugged conveyor, wherein the workpieces are transversely oriented relative to the flow direction. The lug loader includes an array of pairs of endless conveyors for conveying the workpieces downstream, wherein each pair of endless conveyors in the array include two or more endless conveyors spaced laterally apart across the flow direction. The array forms a continuous or discontinuous upper surface in the flow direction for supporting the workpieces translating downstream in the flow direction. Optionally, each pair of endless conveyors in the array may overlap adjacent pairs of endless conveyors in the array. At least one pair of endless conveyors in the array includes independently actuable first and second drives independently driving their corresponding first and second endless conveyors.

Advantageously, at least some of the endless conveyors of a pair or pairs of conveyors are independently actuable so as to correctly orient skewed workpieces anywhere along the transfer system. The pairs of endless conveyors may translate the workpieces in the flow direction at relatively similar downstream velocities between an upstream end and a downstream end of the lug loader.

The independently actuable pairs of endless conveyors may each have corresponding selectively actuable drives so that each of those pairs of endless conveyors is asymmetrically actuable to drive one endless conveyor ahead of another endless conveyor to correct skew of a workpiece on any one of those endless conveyors.

The adjacent pairs of endless conveyors in the array may overlap at adjacent ends thereof by one endless conveyor of the adjacent pairs being inset laterally across the flow direction relative to a corresponding second endless conveyor of the adjacent pairs.

The present disclosure also is intended to include within its ambit a method of virtual lug loading corresponding substantially to the use of the above described apparatus.

Figure 1A:
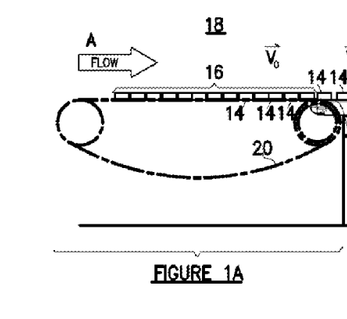
FIG. 1 illustrates a side elevation view of a prior virtual lug loader shown in an elongated view having component views in FIGS. 1A, 1B and 1C intended to be viewed side-by-side in sequence.
Figure 1B:
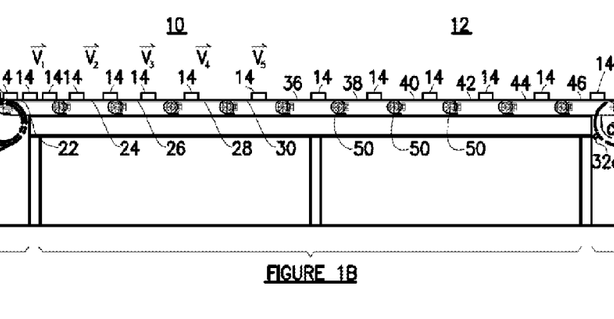
Figure 1C:
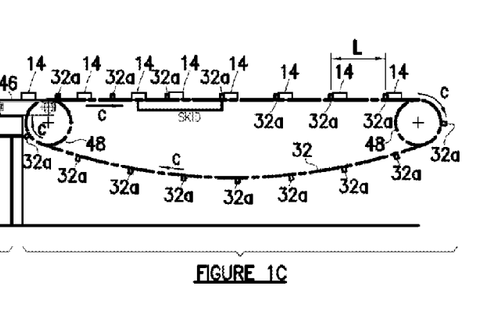
Figure 2A:
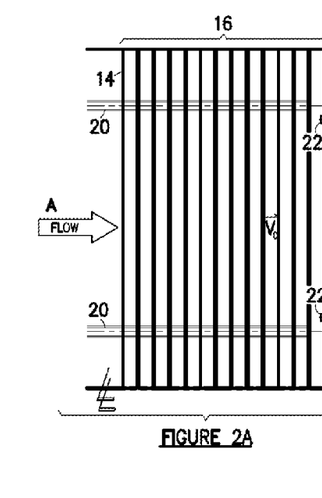
FIG. 2 is a plan view of the virtual lug loader of FIG. 1 shown in an elongated view having component views in FIGS. 2A, 2B and 2C intended to be viewed side-by-side in sequence.
Figure 2B:
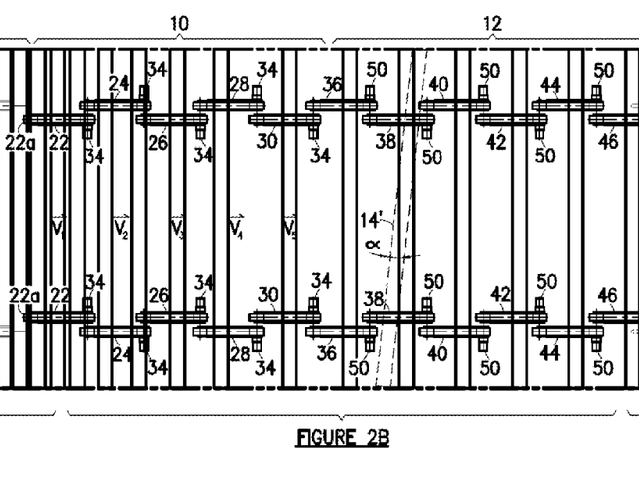
Figure 2C:
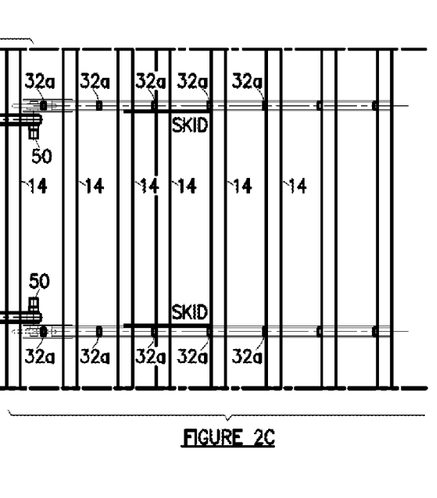
Figure 3:
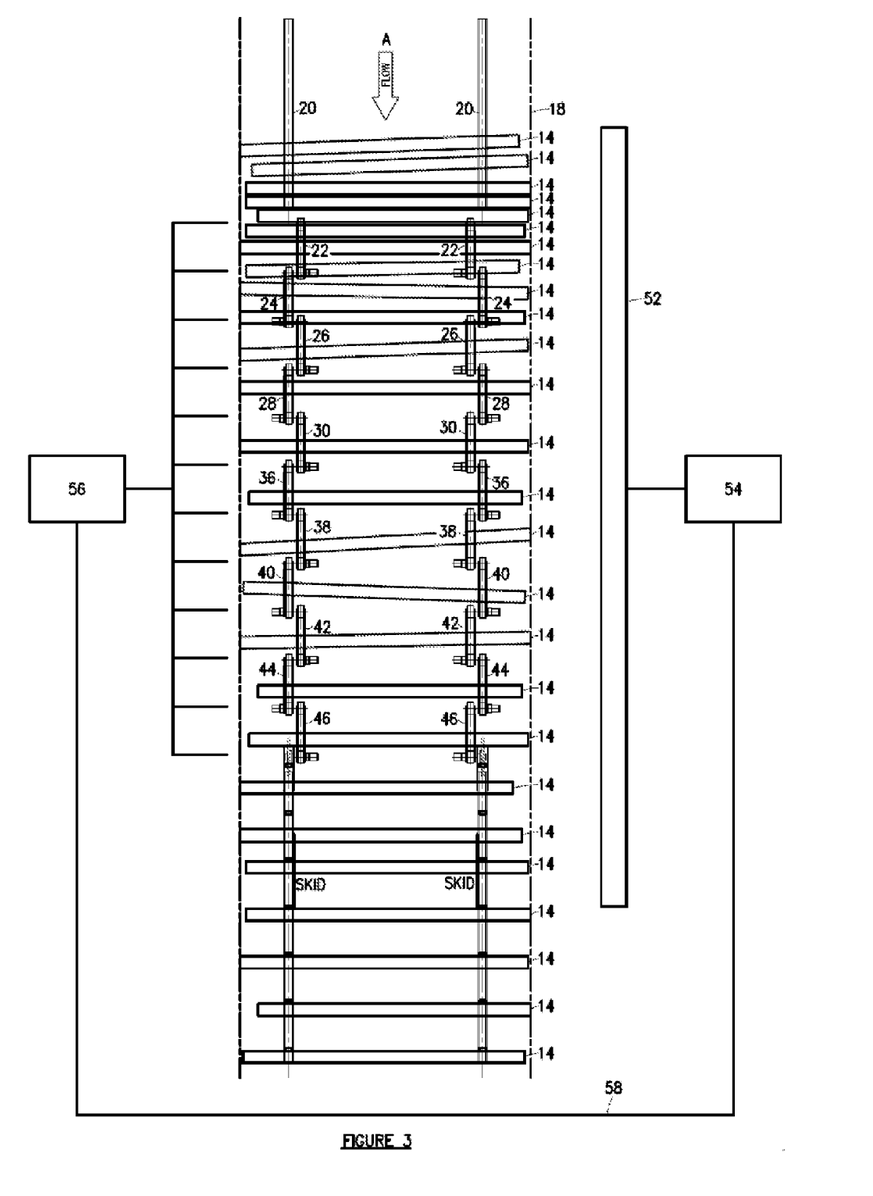
FIG. 3 illustrates the lug loader of FIG. 2 showing, diagrammatically, sensors and controls.

As seen in FIGS. 1-3, wherein similar characters of reference denote corresponding parts in each view, the Virtual Lug Loader disclosed in U.S. Pat. Nos. 7,578,382 and 7,938,247 includes a gapping section 10 immediately upstream, relative to a direction of flow A, of lug loading section 12. Workpieces 14 arrive in direction A so as to form a mat or blanket 16 of workpieces 14 on infeed transfer 18. Workpieces 14 arriving at the upstream end of infeed transfer 18 may be fed from, for example, a tilt hoist, a landing table, an unscrambler, or other wood handling machinery.

Mat 16 is formed on infeed transfer 18 as the workpieces are slowed on transfer belts at the downstream end of infeed transfer 18, workpieces 14 are urged onto the upstream ends 22a of a first pair of belts 22 for progressively faster transla-tion of each workpiece 14 in direction A as the workpieces are transferred from the downstream end of infeed transfer 18 onto sequentially and progressively faster successive pairs of belts 22, 24, 26, 28, and 30 within gapping section 10. Gapping section 10 may, alternatively, may be thought of as a lumber separation zone. Thus, a workpiece 14 having a velocity Vo in direction A on infeed transfer 18, will, once handed off to the first pair of belts 22, have a downstream velocity V1, and then sequentially increasing velocities V2, V3, V4, V5 thereby sequentially increasing the separation between individual work pieces 14 by reason of the progressive acceleration of the boards between pairs of belts.

Advantageously, the separation between individual workpieces 14 is increased as the length of the gaps, distance G between adjacent workpieces is increased, for example to approximately one hundred twenty-five per cent of the length of each lug space, distance L, between lugs 32a of lugged outfeed chains 32. It is understood that, although five pairs of belts 22-30 are illustrated, it is not intended to limit the present invention to five pairs of belts in gapping section 10 as more or fewer pairs of belts will suffice so long as sequential workpieces 14 are separated in direction A so that the gap distance G is at least equal to lug space distance L.

The pairs of belts 22, 24, 26, 28 and 30 in gapping section 10 may each be driven by variable frequency drives or induction motors 34 along with associated gear heads. In the illustrated example, not intended to be limiting, each of the five speed-up zones corresponding to the five belt pairs are approximately sixteen inches long so that the length in the downstream direction of gapping section 10 is approximately six foot, eight inches.

In some embodiments, lug loading section 12 is immediately downstream, and cooperates with, the downstream end of gapping section 10 so that workpieces 14 are smoothly handed off from belts 30, being the downstream most pair of belts in gapping section 10, to the first pair of control zone belts 36 located immediately downstream of the interface between gapping section 10 and lug loading section 12. Lug loading section 12 is a workpiece control zone wherein skew may be corrected such as the skew of a workpiece 14' illustrated in dotted outline on control zone belts 38. Skew correction is accomplished by each belt in each pair of control zone belts 36, 38, 40, 42, 44, and 46 being able and adapted to selectively operate at different speeds. In order to correct skew, for example a skew angle alpha (a) of a skewed workpiece 14 the two belts 38, and subsequent downstream belts as need be, are driven at different speeds relative to one another as board 14' passes over the belts, so that the lagging end of the board catches up with the advanced end of the board until the board is correctly positioned perpendicularly across the direction of flow A.

Apart from operating to correct the skew of workpieces translating downstream in direction A, the independently actuable control zone belts in the belt pairs of lug loading section 12 also, in addition to those belts in gapping section 10, operate to selectively space the boards apart and synchronize the boards with upcoming lugs 32a as the lugged outfeed chains 32 rotate in direction C. Thus the control zone belts are driven by a motion controller (not shown) to accelerate or decelerate pairs of belts 36, 48, 40, 42, 44 and 46 to simultaneously accelerate or decelerate both belts in individual pairs of belts so as to accelerate or decelerate a workpiece which has been corrected for a skew. This is done to synchronize and match the placement of a particular workpiece into, for example, the middle of a corresponding lug space as the workpiece exits the downstream end of lug loading section 12. Thus as may be seen, the acceleration or deceleration of the sequence of workpieces 14 being translated downstream over the sequential array of pairs of belts 38, 40, 42, 44 and 46, are selectively motion controlled so as to place a workpiece 14 entering onto the upstream end of the lugged outfeed chains 32 preferably into for example the middle of a corresponding lug space or otherwise exiting off the downstream end of belts 46 just after a pair of lugs 32a rotate to the vertical as chains 32 rotate endlessly around sprockets 48.

In the illustrated embodiment of FIGS. 1-3, not intended to be limiting, lug loading section 12 has six control zone belt pairs may be thought of as six belt modules each approximately sixteen inches long in the downstream direction for a total downstream length of eight feet. In one preferred embodiment, the motors 50 which selectively individually drive each belt in each belt module, may be servo motors having corresponding gear heads.

It is understood that sensors 52 such as seen in FIG. 3 and known in the prior art, and as would be known to one skilled in the art, would be provided to detect the position of individual boards and that the information from the sensors is processed by a digital processor 54 cooperating with the sensors and that the digital processors also cooperates with a programmable logic controller (PLC) 56 via network 58 which in turn cooperates with the motors for selectively driving the belts 22, 24, 26, 28 and 30 in gapping section 10 and belts 36, 38, 40, 42, 44 and 46 in lug loading section 12.

Figure 4A:
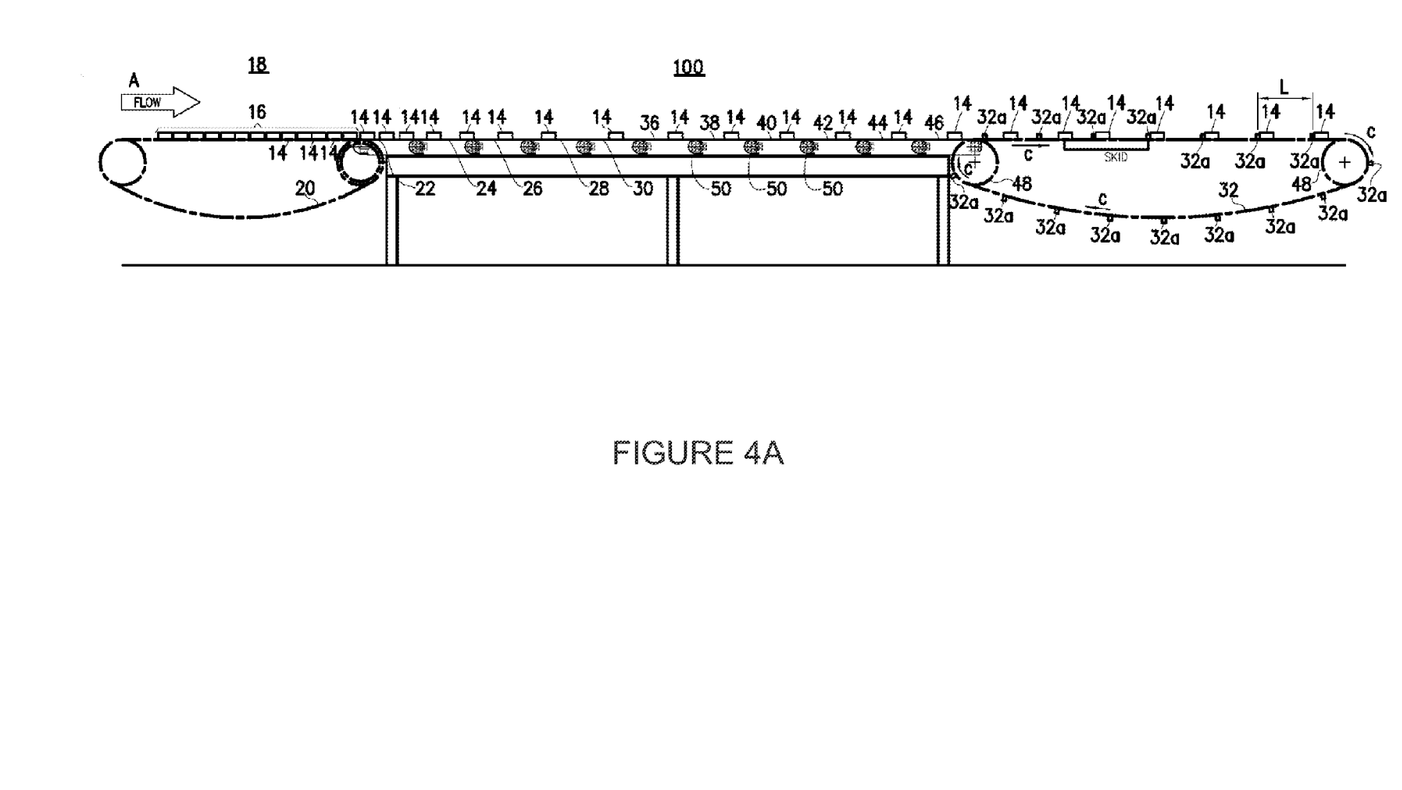
FIGS. 4A-C illustrate a present embodiment of a lug loader and control system.
Figure 4B:
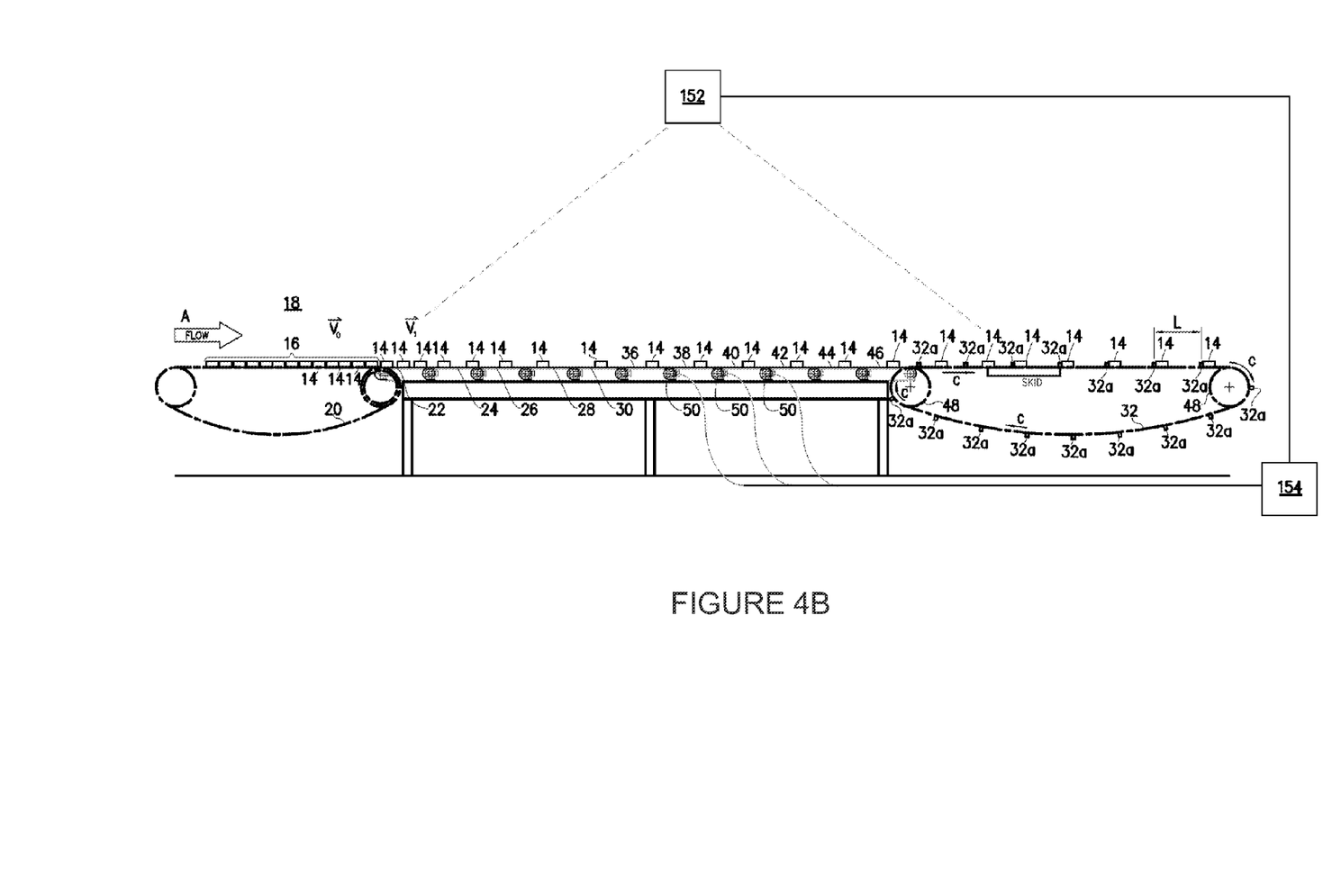
Figure 4C:
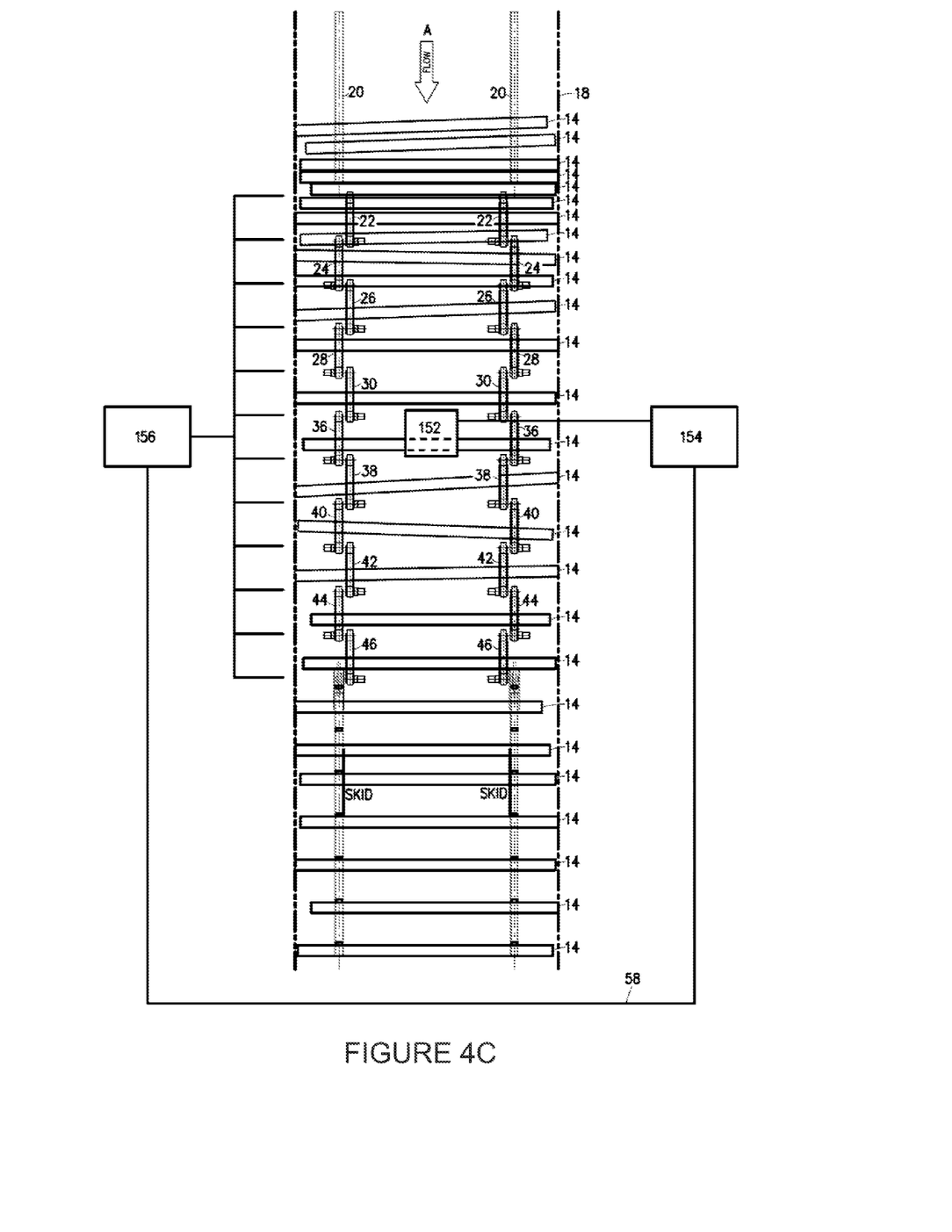
Figure 5:
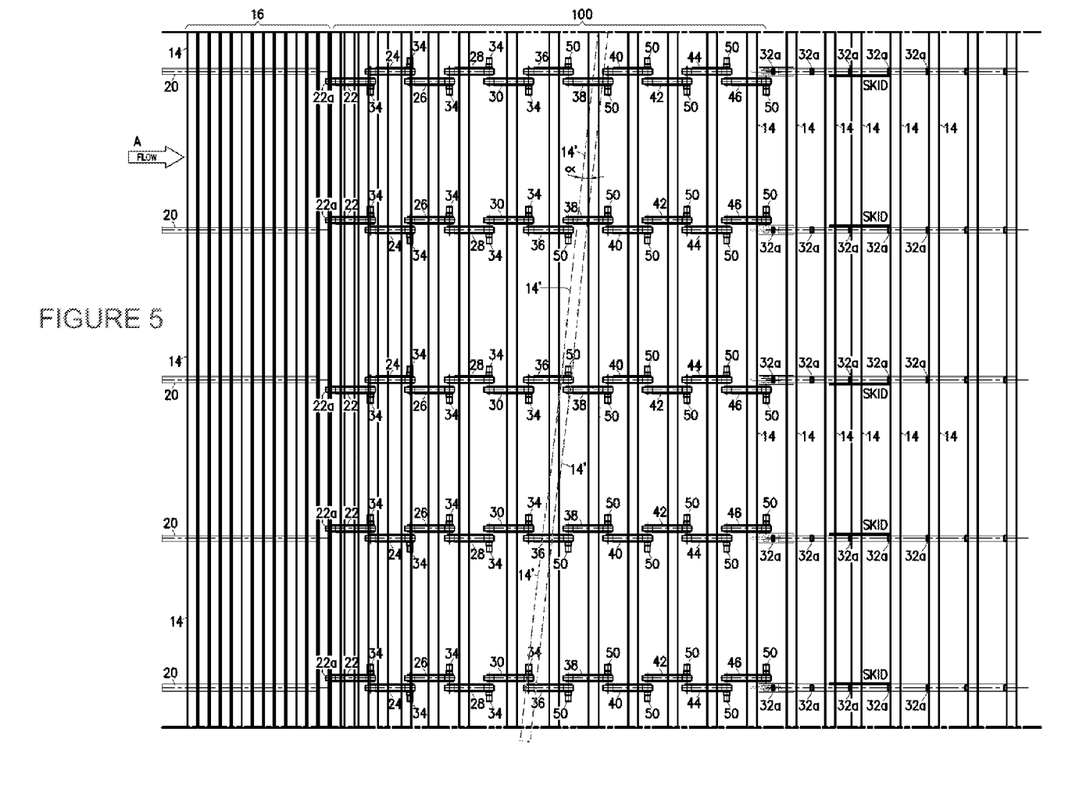
FIG. 5 illustrates another present embodiment of a lug loader, all in accordance with various embodiments.

FIGS. 4A-C and 5 illustrate present embodiments of a lug loader and control system. In the embodiment of FIGS. 4-5, to facilitate the description, components substantially similar to those components identified in FIGS. 1-3 are identified by the same reference characters. Unless otherwise indicated, such components may function in the same or similar manner as described above.

In contrast to the virtual lug loader disclosed in U.S. Pat. Nos. 7,578,382 and 7,938,247, the present embodiment of a lug loader system includes a combined gapping and de-skewing section 100 between infeed transfer 18 and the lugged conveyor (FIG. 4A). Again, successive workpieces 14 are urged from infeed transfer 18 onto the upstream ends 22a of a first pair of belts 22. First pair of belts 22 may be driven at a speed that is greater than the speed of infeed transfer 18. Unlike the above-described embodiment, gaps are created between the workpieces 14 by driving the successive pairs of belts 22, 24, 26, 28, 30, 36, 38, 40, 42, 44, and 46 within section 100 at generally the same or similar speeds. Thus, a workpiece 14 having a velocity Vo in direction A on infeed transfer 18, will, once handed off to the first pair of belts 22, have a downstream velocity V1, and will continue to have approximately the same velocity while traveling on successive pairs of belts except while being de-skewed, if necessary (see e.g., FIGS. 4B and 5).

It is understood that, although eleven pairs of belts 22-46 are illustrated, it is not intended to limit the present invention to eleven pairs of belts in section 100 as more or fewer pairs of belts will suffice. In addition, although the present description refers to "pairs" of belts, it is to be understood that a "pair" may include two, three, four, five, or more than five belts arranged across the direction of workpiece flow. For example, one or more of the pairs of belts 22, 24, 26, 28, 36, 38, 40, 42, 44, and 46 may include five belts, allowing for use of the lug loader to load longer lengths of lumber onto a lugged conveyor. Thus, a relatively long workpiece that is skewed may have a first end that is in contact with a belt of one pair and an opposite end that is in contact with a belt of another pair (see e.g., FIG. 5).

Optionally, one or more of the belts of a pair may be set at different vertical heights. For example, a pair of belts arrayed across the direction of flow may include a first belt at a first side of the conveyor that is positioned at a first vertical distance D1 from an underlying support surface (e.g., a floor), a second belt that is positioned at a second vertical distance D1, a third belt that is positioned at a third vertical distance D3, a fourth belt that is positioned at a fourth vertical distance D4, and a fifth belt that is at the opposite side of the conveyor and is positioned at a fifth vertical distance D5. The vertical heights may increase incrementally from D1 to D5 (e.g., by 0.25 inches). As a result, workpieces conveyed along this pair of belts may be in contact with only two belts. Thus, a workpiece of relatively short length may be in contact with the first belt and the second belt, a workpiece of intermediate length may be in contact with the first belt and the third belt, and a relatively long workpiece may be in contact with the first belt and the fifth belt. In some embodiment, multiple pairs of belts may be arranged in such a manner.

The pairs of belts 22, 24, 26, 28, 30, 36, 38, 40, 42, 44, and 46 in section 100 may each be driven by variable frequency drives or induction motors 34 along with associated gear heads. Skew may be corrected along the length of section 100, such as the skew of a workpiece 14' illustrated in dotted outline in FIG. 5. FIG. 5 shows a relatively long workpiece skewed such that a first end of the workpiece is engaging a first belt of the pair of belts 38 and a second opposite end of the workpiece is engaging a fifth belt of the pair of belts 30. Skew correction is accomplished by selectively operating the two belts in contact with the workpiece to operate at different speeds. Typically, this is done by operating one of the two belts to rotate at a greater speed than the other of the two belts. However, skew correction may alternatively be done by operating one of the two belts to rotate in the direction of flow and operating the other of the two belts to rotate in the opposite direction. In any case, one or more of the belts in at least some of the pairs of belts 22, 24, 26, 28, 30, 36, 38, 40, 42, 44, and 46 may be selectively operated at different speeds in order to correct skew. For example, to correct a skew angle alpha (a) of a skewed workpiece 14, the first belt of the pair of belts 38 and the fifth belt of the pair of belts 30 (and subsequent downstream belts as need be) are driven at different speeds or in different directions relative to one another as board 14' passes over the belts. The belts may be selectively driven to apply relatively greater speed to the lagging end of the board, or to slow the advanced end of the board, until the board is correctly positioned perpendicularly across the direction of flow A.

Apart from operating to correct the skew of workpieces translating downstream in direction A, the belt pairs of section 100 also operate to selectively space the boards apart and synchronize the boards with upcoming lugs 32a as the lugged outfeed chains 32 rotate in direction C. Thus some or all of the belts may be driven by a motion controller (not shown) to simultaneously accelerate or decelerate the belts within individual pairs of belts so as to accelerate or decelerate a workpiece which has been corrected for a skew. This is done to synchronize and match the placement of a particular workpiece into, for example, the middle of a corresponding lug space as the workpiece exits the downstream end of section 100. Thus as may be seen, the acceleration or deceleration of the sequence of workpieces 14 being translated downstream over the sequential array of pairs of belts are selectively motion controlled so as to place a workpiece 14 entering onto the upstream end of the lugged outfeed chains 32 preferably into for example the middle of a corresponding lug space or otherwise exiting off the downstream end of belts 46 just after a pair of lugs 32a rotate to the vertical as chains 32 rotate endlessly around sprockets 48.

In the illustrated embodiment of FIGS. 4-5, not intended to be limiting, section 100 has eleven belt pairs. However, other embodiments may have six, seven, eight, nine, ten, twelve, more than twelve, or fewer than six belt pairs. In one preferred embodiment, motors 50 may selectively individually drive one or more of the belts in a pair. Optionally, motors 50 may be servo motors having corresponding gear heads.

In contrast to the virtual lug loader disclosed in U.S. Pat. Nos. 7,578,382 and 7,938,247, which disclosed sensors 52 (FIG. 3) to detect the position of individual boards, the present embodiment includes a vision camera 152 mounted above the lug loader apparatus such that the field of view encompasses most or all of the pairs of belts (FIGS. 4B, 4C). The vision camera 152 may be coupled to a computer system 154. Computer system 154 may in turn be operatively coupled to motors 50, programmable logic controller 156, a driver of infeed 18, and/or a driver of the lugged conveyor. Together, vision camera 152 and computer system 154 may comprise a vision based lumber flow management system that optimizes lumber flow during processing. Such a system may reduce the expense of installing and maintaining multiple sensors. In addition, the overhead vision camera may provide a clear view of the workpieces and be less susceptible to dust and moisture and reducing the need for frequent maintenance (e.g., lens and reflector cleaning).

The vision based system operates by creating a virtual array of presence detection points along the lug loader. As workpieces travel through the detection area, the system recognizes the presence or absence of workpieces as well as width, length, and skew of the workpieces. Based on this and other data, the computer system 154 may send commands to programmable logic controller (PLC) 156 which in turn cooperates with the motors 50 for selectively driving the belts 22, 24, 26, 28, 30, 36, 38, 40, 42, 44 and 46 in section 100. In this manner, the computer system 154 may selectively drive the belts to de-skew workpieces and create desired gaps between them. Optionally, computer system 154 may also send commands to one or more drivers of infeed 18 and/or the lugged chain conveyor based on this and other data (e.g., to speed or slow infeed 18 and/or the lugged chain conveyor).

While the above description refers to loading a lugged chain conveyor, it is to be understood that a lug loader as described herein may alternatively be used to de-skew and/or create gaps between workpieces upstream or downstream of any other apparatus. Examples include, but are not limited to, a sorter, a ducker, a translineator, a cutting device, and a grading station.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

We claim:

1. An apparatus for transporting successive workpieces in a flow direction, wherein the workpieces are oriented generally transverse to the flow direction, the apparatus comprising:
   a first endless conveyor oriented substantially parallel to the flow direction;
   one or more second endless conveyors spaced laterally apart from the first endless conveyor across the flow direction and oriented substantially parallel to the flow direction, the first endless conveyor being elevated relative to at least one of the one or more second endless conveyors; and
   a first drive coupled with the first endless conveyor and operable to drive the first endless conveyor independently of the one or more second endless conveyors,
   wherein the first endless conveyor and the one or more second endless conveyors are positioned to support generally opposite first and second ends, respectively, of the successive workpieces, and
   wherein the first drive is selectively operable to drive the first endless conveyor at a different speed or rotational direction than the one or more second endless conveyors to thereby adjust a skew angle of a workpiece in contact with the first endless conveyor.

2. The apparatus of claim 1, further comprising one or more third endless conveyors spaced laterally apart across the flow direction downstream of the first and second endless conveyors, the one or more third endless conveyors overlapping the one or more second endless conveyors in the flow direction.

3. The apparatus of claim 1, wherein the one or more second endless conveyors includes at least two second endless conveyors spaced apart across the flow direction.

4. The apparatus of claim 3, further comprising at least two second drives coupled with corresponding ones of the second endless conveyors and operable to drive the corresponding ones of the second endless conveyors asymmetrically.

5. The apparatus of claim 1, wherein the first endless conveyor is one of a plurality of endless conveyors arranged in an overlapping configuration and substantially aligned in the flow direction.

6. The apparatus of claim 3, wherein the second endless conveyors are spaced at intervals across the flow direction to one side of the first endless conveyor, such that the second endless conveyors are collectively operable to support workpieces of different lengths while the first ends of the workpieces are elevated on the first endless conveyor.

7. The apparatus of claim 2, further including a third drive coupled with the one or more third endless conveyors, the third drive configured to drive the one or more third endless conveyors independently of the first endless conveyor and the one or more second endless conveyors.

8. The apparatus of claim 7, wherein the one or more third endless conveyors includes at least two endless conveyors, and the third drive is selectively operable to drive the at least two endless conveyors asymmetrically.

9. The apparatus of claim 7, wherein the one or more third endless conveyors includes at least two endless conveyors, and the third drive is operable to drive the third endless conveyors synchronously at variable speeds.

10. A system for transporting successive workpieces in a flow direction, wherein the workpieces are oriented generally transverse to the flow direction, the system comprising:
   a first endless conveyor oriented substantially parallel to the flow direction;
   one or more second endless conveyors spaced laterally apart from the first endless conveyor across the flow direction and oriented substantially parallel to the flow direction, the first endless conveyor being elevated relative to the one or more second endless conveyors;
   a drive system coupled with at least one of the endless conveyors;
   a sensor configured to detect the successive workpieces on the endless conveyors; and
   a computer system coupled with the drive system and the sensor, the computer system configured to determine, based at least on data from the sensor, a skew angle of one or more of the workpieces on the endless conveyors, and control the drive system to drive the first endless conveyor at a different speed or rotational direction than the one or more second endless conveyors to thereby adjust the skew angle of a workpiece in contact with the first endless conveyor.

11. The system of claim 10, the drive system comprising a first drive coupled with the first endless conveyor and one or more second drives coupled with the one or more second endless conveyors.

12. The system of claim 11, wherein the one or more second endless conveyors includes at least two second endless conveyors spaced apart across the flow direction.

13. The system of claim 12, wherein the one or more second drives includes at least two second drives coupled with corresponding ones of the second endless conveyors, the second drives operable to drive the corresponding ones of the second endless conveyors asymmetrically.

14. The system of claim 10, wherein the first endless conveyor is one of a plurality of endless conveyors arranged in an overlapping configuration and substantially aligned in the flow direction.

15. The system of claim 12, wherein the second endless conveyors are spaced at intervals across the flow direction to one side of the first endless conveyor, such that the second endless conveyors are collectively operable to support workpieces of different lengths while the first ends of the workpieces are elevated on the first endless conveyor.

16. The system of claim 11, further including one or more third endless conveyors spaced laterally apart across the flow direction downstream of the first and second conveyors, the one or more third endless conveyors overlapping the one or more second endless conveyors in the flow direction.

17. The system of claim 16, further including a third drive coupled with the one or more third endless conveyors.

18. The system of claim 17, wherein the one or more third endless conveyors includes at least two third endless conveyors, and the third drive is selectively operable to drive the third endless conveyors synchronously at variable speeds.

19. The system of claim 16, further including at least two third drives coupled with corresponding ones of the at least two third endless conveyors, wherein the third drives are operable to drive the third endless conveyors asynchronously.

20. The system of claim 16, wherein the computer system is further configured to control the drive system to adjust a speed of the one or more third endless conveyors to thereby adjust a gap between two of the successive workpieces.

21. The system of claim 20, wherein a downstream end of the one or more third endless conveyors is disposed proximal to an upstream end of a lugged loader, and the computer system is further configured to synchronize the successive workpieces with corresponding lug spaces of the lugged loader.

22. A method of transporting successive workpieces in a flow direction, wherein the workpieces are oriented generally transverse to the flow direction, the method comprising:

providing a first endless conveyor oriented substantially parallel to the flow direction;

providing one or more second endless conveyors spaced laterally apart from the first endless conveyor across the flow direction and oriented substantially parallel to the flow direction, wherein the first endless conveyor is elevated relative to at least one of the one or more second endless conveyors; and driving the first endless conveyor at a different speed or rotational direction than the one or more second endless conveyors to thereby adjust a skew angle of at least one of the successive workpieces while said at least one of the successive workpieces is in contact with the first endless conveyor.

23. The method of claim 22, further comprising providing one or more third endless conveyors spaced laterally apart across the flow direction downstream of the first and second endless conveyors, wherein the one or more third endless conveyors overlap the one or more second endless conveyors in the flow direction.

24. The method of claim 22, wherein the one or more second endless conveyors includes at least two second endless conveyors spaced apart across the flow direction, the method further comprising driving the corresponding ones of the second endless conveyors symmetrically.

25. The method of claim 22, wherein the one or more second endless conveyors includes at least two second endless conveyors spaced apart across the flow direction, the method further comprising driving the corresponding ones of the second endless conveyors asymmetrically.

26. The method of claim 22, wherein the first endless conveyor is one of a plurality of endless conveyors arranged in an overlapping configuration and substantially aligned in the flow direction.

27. The method of claim 22, wherein the second endless conveyors are spaced at intervals across the flow direction to one side of the first endless conveyor, such that the second endless conveyors are collectively operable to support workpieces of different lengths while the first ends of the workpieces are elevated on the first endless conveyor.

28. The method of claim 23, further including driving the one or more third endless conveyors independently of the first endless conveyor and the one or more second endless conveyors.

29. The method of claim 28, wherein the one or more third endless conveyors includes a plurality of third endless conveyors, the method further including adjusting a speed of the third endless conveyors to adjust a gap between a workpiece on the third endless conveyors and another one of the successive workpieces.

30. The method of claim 28, wherein a downstream end of the one or more third endless conveyors is positioned proximal to an upstream end of a lugged conveyor, the method further including adjusting a speed of the one or more third endless conveyors to synchronize the successive workpieces with corresponding lug spaces of the lugged conveyor.

* * * * *